United States Patent
Otsuka et al.

(10) Patent No.: US 7,933,098 B2
(45) Date of Patent: Apr. 26, 2011

(54) THIN FILM MAGNETIC HEAD USING A SHUNT LINE CONNECTING TO THE MAGNETIC LAYER AT A POSITION THAT DEVIATES FROM THE CENTER OF THE HEAT GENERATING REGION

(75) Inventors: Tomoo Otsuka, Niigata-ken (JP); Manabu Usui, Niigata-ken (JP)

(73) Assignee: TDK Corporation, Tokyo (JP)

( * ) Notice: Subject to any disclaimer, the term of this patent is extended or adjusted under 35 U.S.C. 154(b) by 833 days.

(21) Appl. No.: 11/939,107

(22) Filed: Nov. 13, 2007

(65) Prior Publication Data
US 2008/0144216 A1 Jun. 19, 2008

(30) Foreign Application Priority Data
Dec. 15, 2006 (JP) .................................. 2006-338158

(51) Int. Cl.
*G11B 5/56* (2006.01)
(52) U.S. Cl. .................................................. 360/294.7
(58) Field of Classification Search ................. 360/294.7
See application file for complete search history.

(56) References Cited

U.S. PATENT DOCUMENTS
7,199,982 B2 * 4/2007 Suk ............................. 360/294.7
7,729,086 B1 * 6/2010 Song et al. ................ 360/125.31

FOREIGN PATENT DOCUMENTS
JP 2004-206790 7/2004

* cited by examiner

*Primary Examiner* — A. J. Heinz
(74) *Attorney, Agent, or Firm* — Brinks Hofer Gilson & Lione

(57) ABSTRACT

A thin film magnetic head is disclosed that is capable of improving the thermal efficiency of a heater. A thin film magnetic head includes: a lower shield layer; an upper shield layer; a reproducing element that is provided between the lower shield layer and the upper shield layer; a recording element that is formed on the upper shield layer; a heater that generates heat to expand at least one of the reproducing element and the recording element such that the reproducing element and/or the recording element protrude toward a recording medium; and a shunt line that applies a reference potential that is equal to the potentials of the lower shield layer and the upper shield layer to a magnetic layer of the recording element. In the thin film magnetic head, the shunt line is connected to the magnetic layer of the recording element at a position that deviates from the center of a heat generating region of the heater in a track width direction.

6 Claims, 4 Drawing Sheets

THIN FILM MAGNETIC HEAD USING A SHUNT LINE CONNECTING TO THE MAGNETIC LAYER AT A POSITION THAT DEVIATES FROM THE CENTER OF THE HEAT GENERATING REGION

CLAIM OF PRIORITY

This application claims benefit of the Japanese Patent Application No. 2006-338158 filed on Dec. 15, 2006, which is hereby incorporated by reference.

BACKGROUND

1. Field of the Invention

The present invention relates to a thin film magnetic head having a heater that is supplied with power and generates heat provided in the vicinity of an element.

2. Description of the Related Art

In general, a thin film magnetic head includes a reproducing element that reads out magnetic information from a recording medium using magnetoresistance and a recording element that is formed on the reproducing element and applies a recoding magnetic field to the recording medium to record magnetic information on the recording medium. As known in the art, the reproducing element is provided between a lower shield layer and an upper shield layer with gap layers interposed therebetween. For example, in a vertical recording type, the recording element includes a main magnetic pole layer and a return yoke layer that are exposed from a surface facing a recording medium, with a magnetic gap layer interposed therebetween, and a recording coil that applies a recoding magnetic field to the main magnetic pole layer. In recent years, the following structure has been proposed: a heater that is supplied with power and generates heat that is provided in the vicinity of an element; and the element protrudes toward a recording medium by thermal expansion such that the gap between the element and the recording medium is locally narrowed, thereby improving reproducing/recording performances.

In this thin film magnetic head, it is necessary to keep the surface of a metal material exposed from the surface facing a recording medium at the same potential in order to prevent the electrostatic damage of an element. Specifically, for example, the following structure has been proposed: a shunt line for applying the same reference potential is provided in each of an upper shield layer, a lower shield layer, and a return yoke layer. According to the structure including the shunt lines, when a reproducing element having a CPP structure in which a current flows in the vertical direction to the surface of a magnetoresistive film, such as a TMR element using tunneling magnetoresistance, is used, that is, when both the lower shield layer and the upper shield layer are not connected to the ground such that the lower shield layer and the upper shield layer serve as electrodes of the reproducing element, it is possible to prevent the electrostatic damage of the reproducing element. In addition, since it is not necessary to directly connect the lower shield layer, the upper shield layer, and the return yoke layer, noise generated from the return yoke layer has no adverse effect on the output of the reproducing element. JP-A-2004-206790 discloses a structure that applies a guide potential that is equal to that of the lower shield layer or the upper shield layer to a lower magnetic pole layer of a recording element.

However, in the thin film magnetic head having the heater provided in the vicinity of the element, when the shunt line is provided in the return yoke layer, heat generated from the heater is dissipated through the shunt line. As a result, the thermal efficiency of the heater (the ratio of the amount of heat transmitted to the element to the amount of heat generated by the heater) is lowered.

SUMMARY

According to an aspect of the invention, a thin film magnetic head includes: a lower shield layer; an upper shield layer; a reproducing element that is provided between the lower shield layer and the upper shield layer; a recording element that is formed on the upper shield layer; a heater that generates heat to expand at least one of the reproducing element and the recording element such that the reproducing element and/or the recording element protrude toward a recording medium; and a shunt line that applies a reference potential that is equal to the potentials of the lower shield layer and the upper shield layer to a magnetic layer of the recording element. In the thin film magnetic head, the shunt line is connected to the magnetic layer of the recording element at a position that deviates from the center of a heat generating region of the heater in a track width direction. In a longitudinal recording type, the magnetic layer of the recording element is a lower core layer or an upper core layer. In a vertical recording type, the magnetic layer of the recording element is a return yoke layer.

In the thin film magnetic head according to the above-mentioned aspect, preferably, the shunt line is connected to the magnetic layer of the recording element outside the heat generating region of the heater in the track width direction.

In the thin film magnetic head according to the above-mentioned aspect, preferably, the shunt line is formed of a non-magnetic metal material.

According to an aspect of the invention, a shunt line for allying a reference potential to a magnetic layer of a recording element is connected to the magnetic layer at a position that deviates from the center of a heat generating region of a heater. Therefore, it is possible to provide a thin film magnetic head capable of reducing thermal diffusion due to the shunt line and thus improving the thermal efficiency of a heater.

DESCRIPTION OF THE EMBODIMENTS

Figure 1:
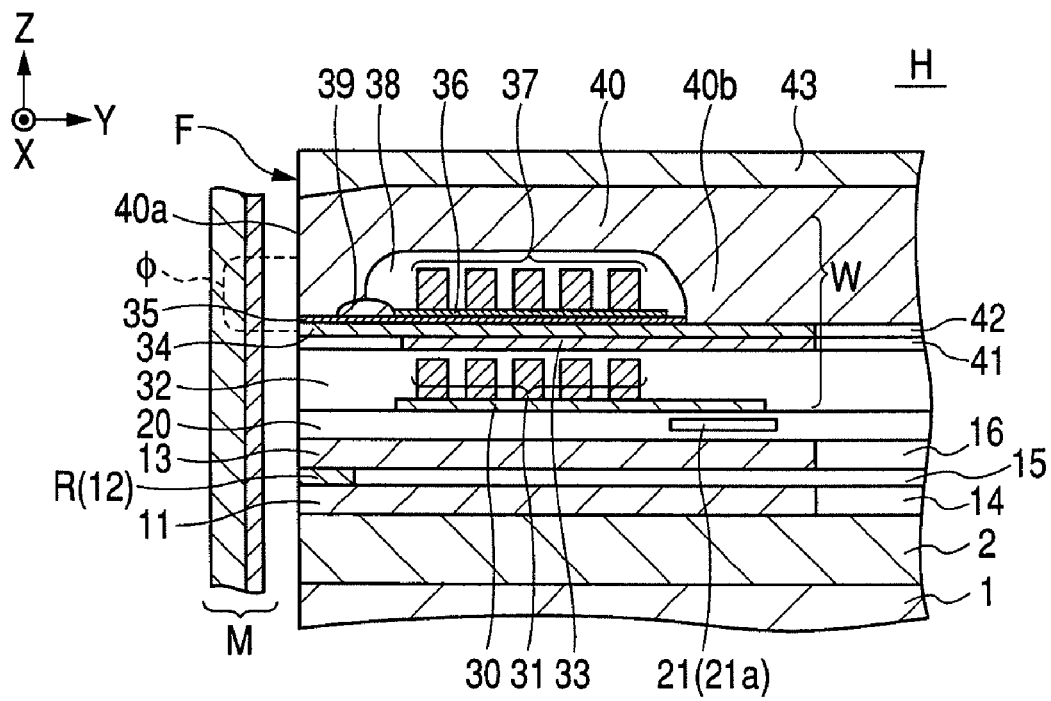
FIG. 1 is a longitudinal cross-sectional view illustrating the structure of a thin film magnetic head according to an embodiment of the disclosure, which is taken along the center line of an element.

FIG. 1 is a longitudinal cross-sectional view illustrating the structure of a thin film magnetic head H according to an embodiment of the disclosure, which is taken along the center line of an element. In FIG. 1, an X direction indicates a track width direction, a Y direction indicates a height direction, and a Z direction indicates a direction in which layers of the thin film magnetic head are laminated.

The thin film magnetic head H is a so-called compound type thin film magnetic head having a laminated structure of a reproducing element R and a recording element W. In this embodiment, the reproducing element R is a tunneling magnetoresistive element (a TMR element) that reads out reproduction signals from a recording medium using a tunneling effect, and the recording element W is a vertical recording type recording element that vertically applies a recoding magnetic field Φ to a recording medium M to record information on the recording medium.

The reproducing element R is provided between a lower shield layer 11 and an upper shield layer 13 that are formed of a conductive magnetic material, such as NiFe, and is formed of a multi-layer film 12 of an antiferromagnetic layer, a pinned magnetic layer, an insulating barrier layer, a free magnetic layer, and a conductive layer that are sequentially formed on the lower shield layer 11. The lower shield layer 11 and the upper shield layer 13 protrude from the reproducing element R in the track width direction and the height direction, and serve as an upper electrode layer and a lower electrode layer that make a current flow in the vertical direction to the surfaces of the layers of the reproducing element R, respectively. The lower shield layer 11 is formed on an $Al_2O_3$ undercoat film 2 of a head substrate 1. Although not shown in FIG. 1, an insulating layer, a bias layer, and an insulating layer are sequentially formed on the lower shield layer 11 at both sides of the reproducing element R, and the lower shield layer 11 and the upper shield layer 13 are electrically insulated from each other by the insulating layer and an insulating layer 15 covering a rear side of the reproducing element R in the height direction. Insulating layers 14 and 16 are formed at the rear sides of the lower shield layer 11 and the upper shield layer 13 in the height direction, respectively, and these insulating layers 14, 15, and 16 are formed of an insulating material, such as $Al_2O_3$ or $SiO_2$.

The recording element W is provided on the upper shield layer 13 with a separating layer 20 interposed therebetween. The recording element w includes: a main magnetic pole layer 34 and a return yoke layer 40 that are formed of a ferromagnetic material having high saturation magnetic flux density, such as Ni—Fe, Co—Fe, or Ni—Fe—Co; a magnetic gap layer 35 that is interposed between the main magnetic pole layer 34 and the return yoke layer 40 on a surface F facing the recording medium M (a surface facing a recording medium) and is formed of a non-magnetic material, such as $Al_2O_3$, $SiO_2$, Au, or Ru; coil layers 31 and 37 that apply a recoding magnetic field to the main magnetic pole layer 34; an auxiliary yoke layer 33 that is formed of a magnetic material having a lower saturation magnetic flux density than that forming the main magnetic pole layer 34 and is formed immediately below the main magnetic pole layer 34; and a height determining layer 39 that is formed on the magnetic gap layer 35 at a position that is recessed from the surface F facing the recording medium by a predetermined distance. For the side surface of the main magnetic pole layer 34 exposed from the surface F facing the recording medium, a length thereof in the X direction of FIG. 1 serves as a writing track width. A portion of the return yoke layer 40, which is in the range between an end surface 40a exposed from the surface F facing the recording medium and a position that is recessed from the end surface 40a by a predetermined distance (gap), faces the main magnetic pole layer 34. In addition, the return yoke layer 40 is connected to the main magnetic pole layer 34 by a connecting portion 40b that is positioned at the rear side of the end surface 40a in the height direction. As can be seen from a plan view of FIG. 3, the size of the return yoke layer 40 is larger than the main magnetic pole layer 34 in the track width direction and the height direction. Insulating layers 41 and 42 formed of, for example, $Al_2O_3$, $SiO_2$, or Al—Si—O, are formed around the main magnetic pole layer 34 and the auxiliary yoke layer 33, respectively. The lower coil layer 31 is provided on the upper shield layer 13 with a coil insulating base layer 30 interposed therebetween, and the upper coil layer 37 is provided on the magnetic gap layer 35 with a coil insulating base layer 36 interposed therebetween. The lower and upper coil layers 31 and 37 have a plurality of coils that extend in the track width direction and are aligned in the height direction. The ends of the coils are connected to each other such that the connected coils are wound around the main magnetic pole layer 34 and the auxiliary yoke layer 33, thereby forming a solenoid. The coils included in the lower coil layer 31 and the upper coil layer 37 are formed of one or more kinds of non-magnetic metal materials selected from, for example, Au, Cu, Al, Pt, Ag, W, Ni, NiP, Rh, Fe, Co, Cr, Ta, and Ti. The lower coil layer 31 and the upper coil layer 37 are covered with coil insulating layers 32 and 38 formed of an organic insulating material, such as resist, respectively. The upper surfaces of the coil insulating layers 32 and 38 planarized, and the auxiliary yoke layer 33 and the return yoke layer 40 are formed on the planarized coil insulating layers 32 and 38, respectively. A protective layer 43 formed of, for example, $Al_2O_3$ is formed on the return yoke layer 40.

A heater 21 that is supplied with power and generates heat is provided in the separating layer 20 interposed between the reproducing element R and the recording element W. As can be seen from the plan view of FIG. 3, the heater 21 includes a heat generating region 21a that actually generates heat and has an M shape in plan view and a pair of lead electrodes 21b that extend in the height direction from both ends of the heat generating region 21a in the track width direction. The heat generating region 21a has a heat generating region center α that is heated at a high temperature when power is supplied to the lead electrode 21b at its center in the track width direction. The heat generating region center α is aligned with the center of an element (the center of the reproducing track width and the writing track width). The heat generating region 21a has an arbitrary pattern shape. In this embodiment, the distance between one end 21a1 and the other end 21a2 of the heat generating region 21a in the track width direction is referred to as a heater width D. The pair of lead electrodes 21b comprises feeding electrodes, each having a larger width than that of the heat generating region 21a. Heat generated by the heater 21 is transmitted to the surface F facing the recording medium to cause an element portion (the reproducing element R and the main magnetic pole layer 34 of the recording element W) to locally expand toward the recording medium M. In this case, as the amount of heat transmitted from the heater 21 to the element portion increases, the amount of protrusion of the element portion becomes larger, and the distance between the element portion and the recording medium M is shortened, which results in the improvement of recording characteristics. The heat generating region 21a of the heater 21 is formed of, for example, NiFe, CuNi, or CuMn, and the pair of lead electrodes 21b may be integrated with or separated from the heat generating region 21a.

Figure 2:
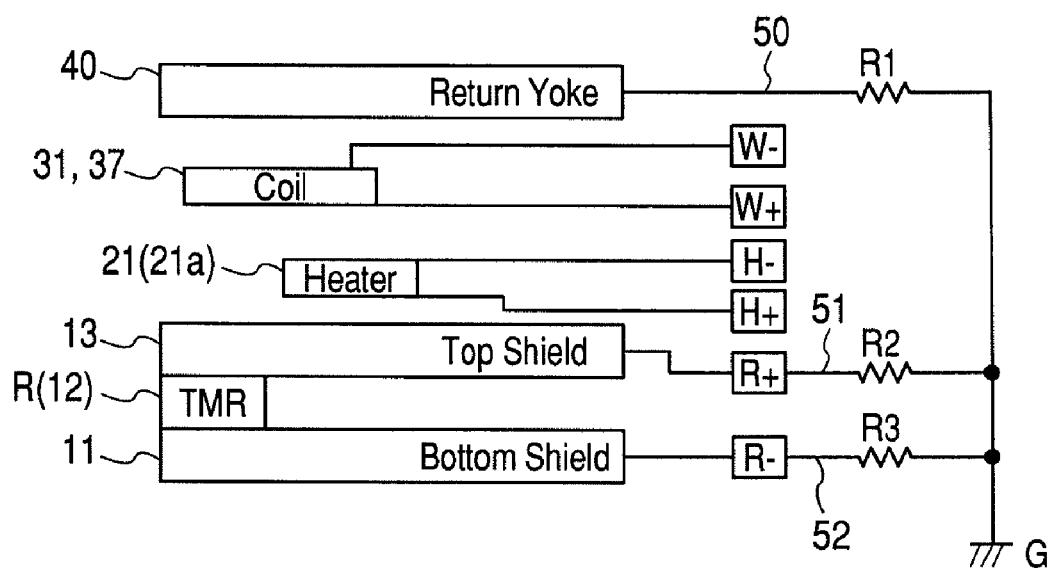
FIG. 2 is a conceptual diagram illustrating shunt lines for applying the same reference potential to a lower shield layer, an upper shield layer, and a return yoke layer.

As shown in a conceptual diagram of FIG. 2, in the thin film magnetic head H having the above-mentioned structure, the lower shield layer 11, the upper shield layer 13, and the return yoke layer 40 are provided with shunt lines 52, 51, and 50 for applying the same reference potential, respectively. The shunt line 52 has one end connected to the lower shield layer 11 and the other end connected to the ground G through a resistor R3. The shunt line 51 has one end connected to the upper shield layer 13 and the other end connected to the ground G through a resistor R2. The shunt line 50 has one end connected to the return yoke layer 40 and the other end connected to the ground G through a resistor R1. The resistance values of the resistors R1 to R3 are appropriately set such that the lower shield layer 11, the upper shield layer 13, and the return yoke layer 40 have the same reference potential. The shunt lines 50 to 52, having their own resistances, may be used as the resistors R1 to R3, or additional resistors other than the shunt lines 50 to 52 may be used. The other ends of the shunt lines 50 to 52 can be connected to the resistors R1 to R3 and the ground G by contact units that are provided in the direction in which the components of the thin film magnetic head H are laminated (the Z direction in the drawings). In addition, when the shunt lines 50 and 52 serve as the resistors R1 to R3, the other ends of the shunt lines 50 to 52 are connected to only the ground G. When the lower shield layer 11, the upper shield layer 13, and the return yoke layer 40 (and the main magnetic pole layer 34 connected to the return yoke layer 40), which are metal material surfaces exposed from the surface F facing the recording medium, are kept at the same potential, electrostatic damage does not occur in the reproducing element R and the recording element W even when electrostatic discharge occurs during the manufacture or use of the thin film magnetic head.

The shunt line 50 for applying the reference potential to the return yoke layer 40 is formed of one or more kinds of non-magnetic metal materials selected from, for example, Au, Cu, Al, Pt, Ag, W, Ni, NiP, Rh, Fe, Co, Cr, Ta, and Ti. The shunt line 50 can be formed in the process of forming the layer coil 37. It is proved that the shunt line 50 has a higher thermal conductivity than $Al_2O_3$ existing around the heater 21 (for example, the separating layer 20, the coil insulating base layer 30, the coil insulating layer 32, the insulating layer 41, and the insulating layer 42), and the shunt line 50 changes the distribution of heat generated from the heater 21 according to the position where the shunt line 50 is connected to the return yoke layer 40 (see FIG. 8).

This embodiment is characterized in a connection structure between the return yoke layer 40 and the shunt line 50. Next, the connection structure between the shunt line 50 (150, 250, 350, and 450) and the return yoke layer 40 will be described in detail with reference to FIGS. 3 to 7.

Figure 3:
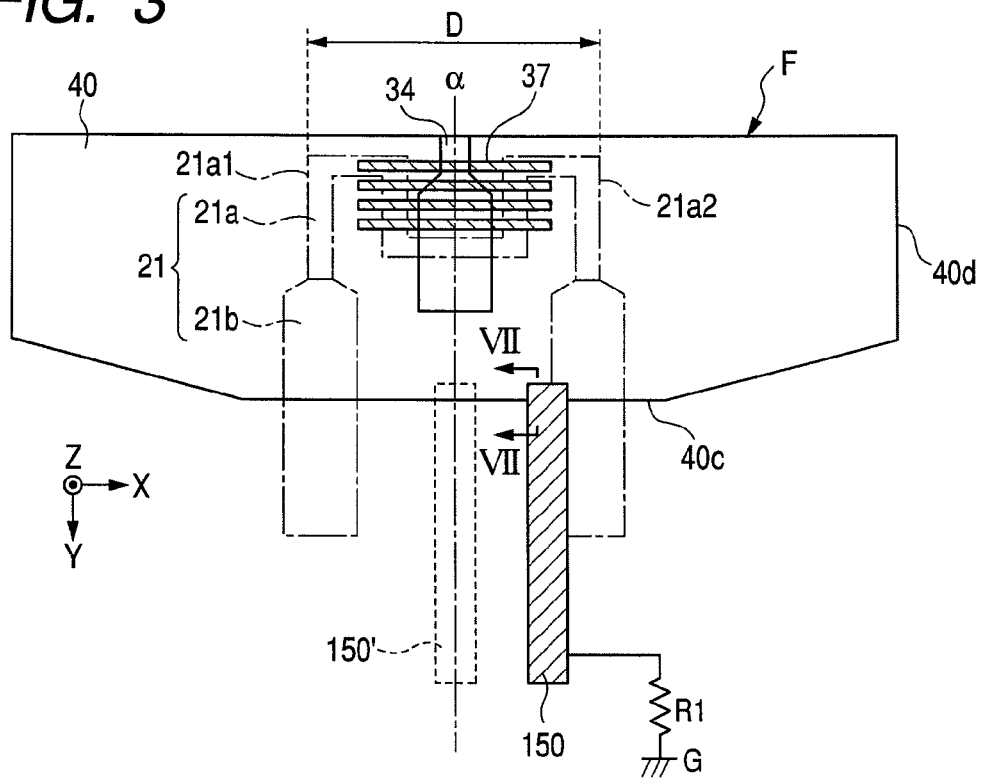
FIG. 3 is a plan view illustrating a shunt line having a first connection structure.
Figure 7:
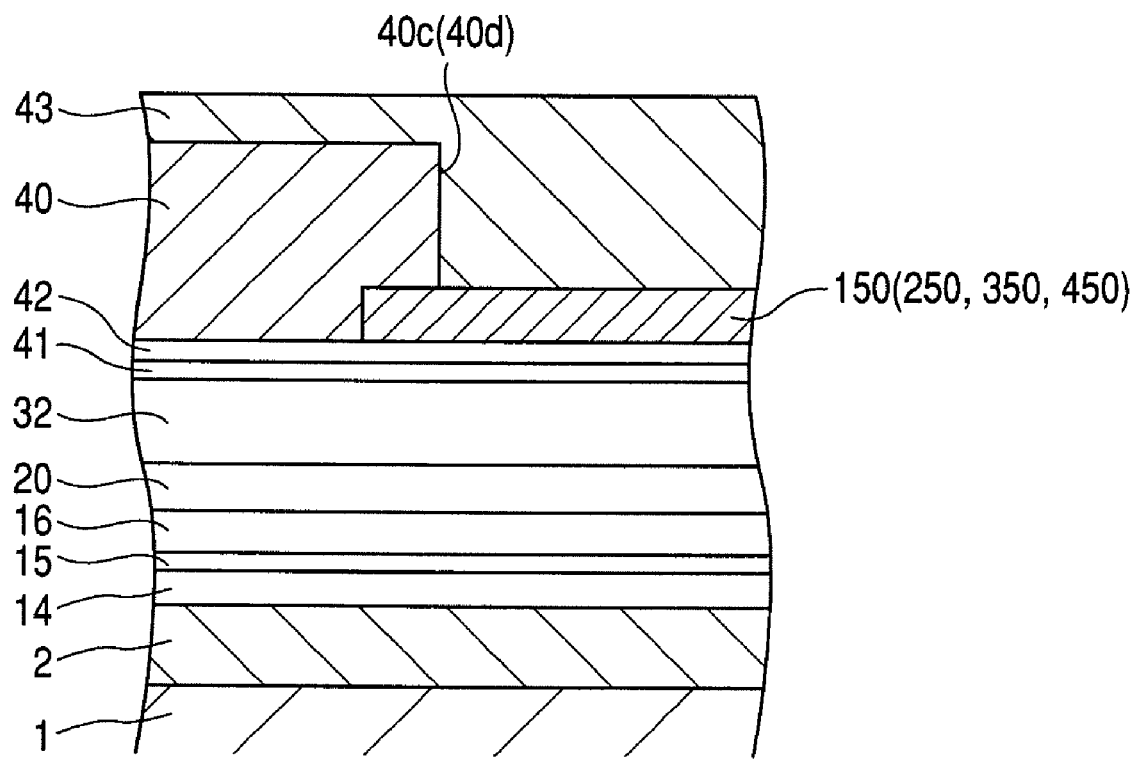
FIG. 7 is a cross-sectional view illustrating the shunt lines having the first to fourth connection structures.

FIGS. 3 and 7 are a plan view and a cross-sectional view illustrating a shunt line 150 having a first connection structure, respectively. The shunt line 150 is a linear pattern that is formed on the insulating layer 42 covering the periphery of the main magnetic pole layer 34 so as to extend inward from the return yoke layer 40 in the height direction. The shunt line 150 is connected to a rear portion 40c of the return yoke layer 40 in the height direction at a position that deviates from the heat generating region center α of the heater 21 in the track width direction. The rear portion 40c of the return yoke layer 40 in the height direction is overlaid on the shunt line 150 and is fixedly connected to the shunt line 150. In this structure shown in FIGS. 3 and 7, the heater width D is about 20 μm, and the return yoke layer 40 and the shunt line 150 are connected to each other at a position that is spaced from the heat generating region center α by a distance of 5 to 10 μm in the track width direction (the right side in the drawings). Since the temperature of the heat generating region center α of the heater 21 is high, a maximum amount of heat is dissipated from the shunt line 150 when the shunt line 150 is positioned on an extension line of the heat generating region center α. When the shunt line 150 is connected to the return yoke layer 40 at a position that deviates from the heat generating region center α, it is possible to reduce the amount of heat dissipated from the shunt line 150, as compared to the structure in which the shunt line 150 is provided on the extension line of the heat generating region center α (reference numeral 150' that is represented by a dotted line in FIG. 3), and thus improve the thermal efficiency of a heater.

Figure 4:
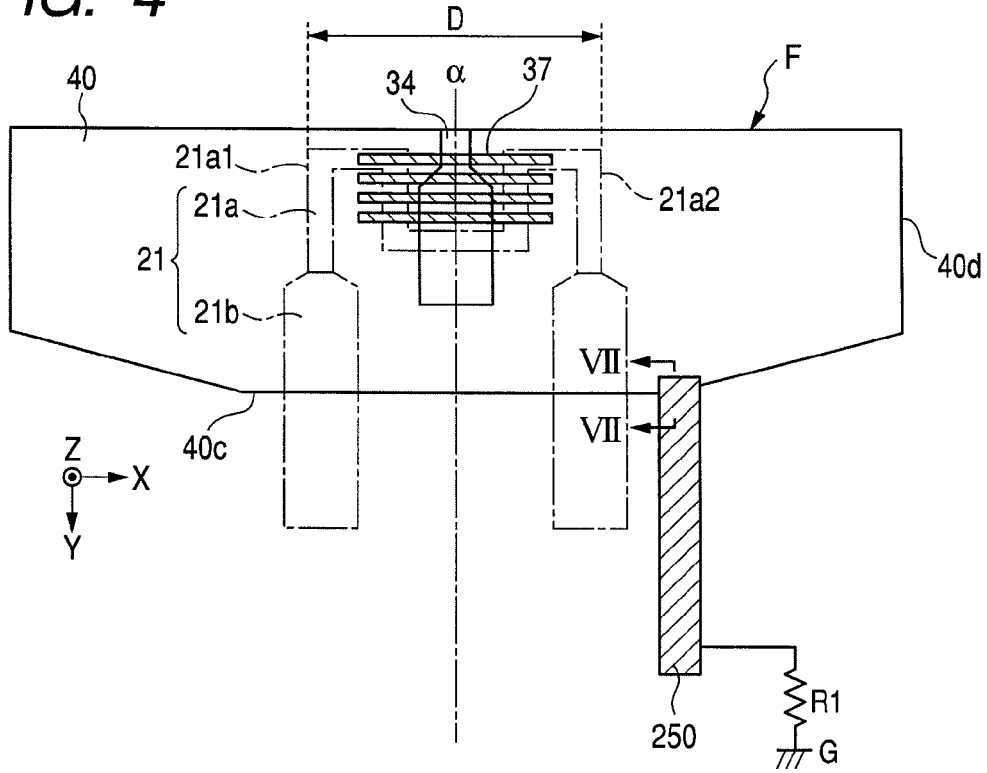
FIG. 4 is a plan view illustrating a shunt line having a second connection structure.

FIGS. 4 and 7 are a plan view and a cross-sectional view illustrating a shunt line 250 having a second connection structure, respectively. The shunt line 250 is a linear pattern that is formed on the insulating layer 42 covering the periphery of the main magnetic pole layer 34 so as to extend inward from the return yoke layer 40 in the height direction. The shunt line 250 is connected to the rear portion 40c of the return yoke layer 40 in the height direction at a position that deviates from a heat generating region 21a of the heater 21 in the track width direction (at the right side of an edge 21a2 of the heat generating region 21a in the track width direction). The rear portion 40c of the return yoke layer 40 in the height direction is overlaid on the shunt line 250 and is fixedly connected to the shunt line 250. In this structure shown in FIGS. 4 and 7, the heater width D is about 20 μm, and the return yoke layer 40 and the shunt line 250 are connected to each other at a position that is spaced from the heat generating region center α by a distance of 15 μm in the track width direction (the right side in the drawings). According to the second connection structure, the shunt line 250 is connected to the return yoke layer 40 outside the heat generating region 21a of the heater 21, and the distance between the shunt line 250 and the heat generating region center α in the track width direction is longer than that in the first connection structure, which makes it possible to further reduce the amount of heat dissipated from the shunt line 250.

Figure 5:
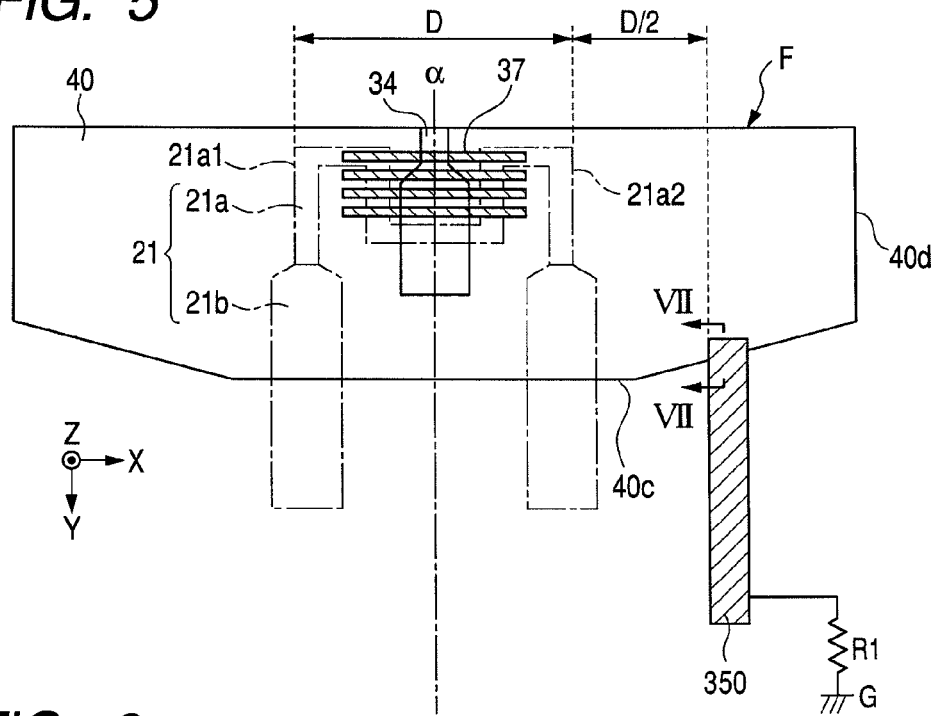
FIG. 5 is a plan view illustrating a shunt line having a third connection structure.

FIGS. 5 and 7 show a plan view and a cross-sectional view illustrating a shunt line 350 having a third connection structure, respectively. The shunt line 350 is a linear pattern that is formed on the insulating layer 42 covering the periphery of the main magnetic pole layer 34 so as to extend inward from the return yoke layer 40 in the height direction. The shunt line 350 is connected to the rear portion 40c of the return yoke layer 40 in the height direction at a position that is spaced from an edge 21a2 of the heat generating region 21a of the heater 21 in the track width direction by a distance that is equal to or longer than half of the heater width D. The rear portion 40c of the return yoke layer 40 in the height direction is overlaid on the shunt line 350 and is fixedly connected to the shunt line 350. In this structure shown in FIGS. 5 and 7, the heater width D is about 20 μm, and the return yoke layer 40 and the shunt line 350 are connected to each other at a position that is spaced from the heat generating region center α by a distance of 20 μm in the track width direction (the right side in the drawings). According to the third connection structure, the distance between the shunt line 350 and the heat generating region center α in the track width direction is longer than those in the first and second connection structures, which makes it possible to further reduce the amount of heat dissipated from the shunt line 350 and thus considerably improve the thermal efficiency of a heater.

Figure 6:
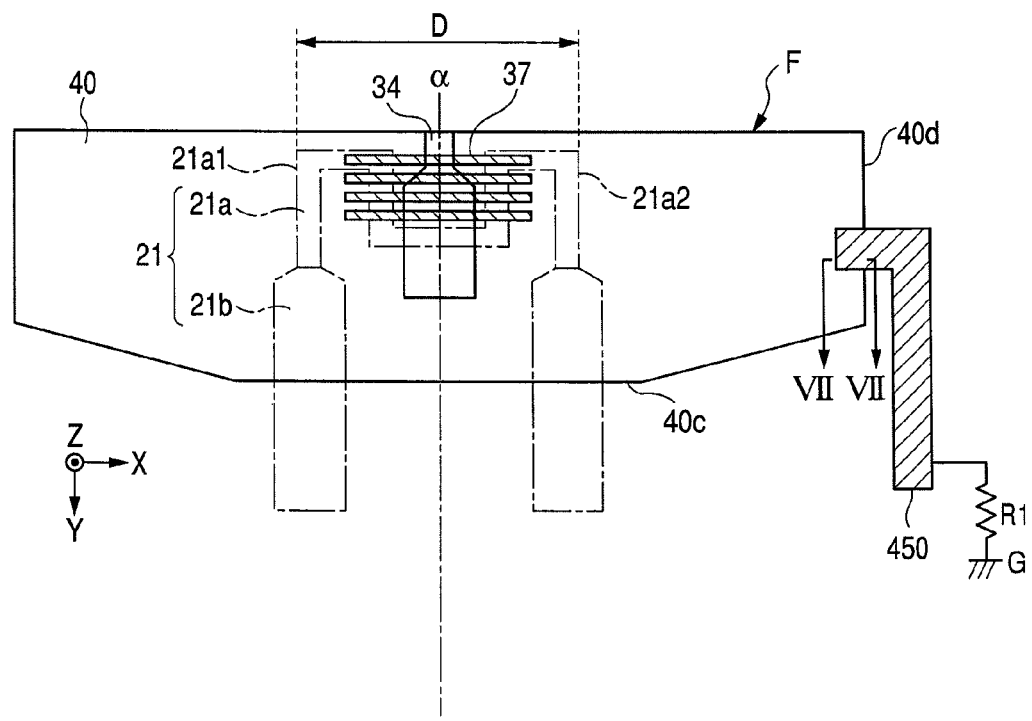
FIG. 6 is a plan view illustrating a shunt line having a fourth connection structure.

FIGS. 6 and 7 show a plan view and a cross-sectional view illustrating a shunt line 450 having a fourth connection structure, respectively. The shunt line 450 is formed in an inverted L pattern on the insulating layer 42 covering the periphery of the main magnetic pole layer 34 so as to extend in the height direction from an edge 40d of the return yoke layer 40 in the track width direction. The shunt line 450 is connected to the edge 40d of the return yoke layer 40 in the track width direction, which is furthest from the heat generating region center α of the heater 21 in the track width direction. According to the fourth connection structure, similar to the third connection structure, the shunt line 450 is connected to the return yoke layer 40 at a position that is sufficiently distant from the heat generating region center α of the heater 21 in the track width direction. Therefore, it is possible to reduce the amount of heat dissipated from the shunt line 450, and thus improve the thermal efficiency of a heater.

Figure 8:
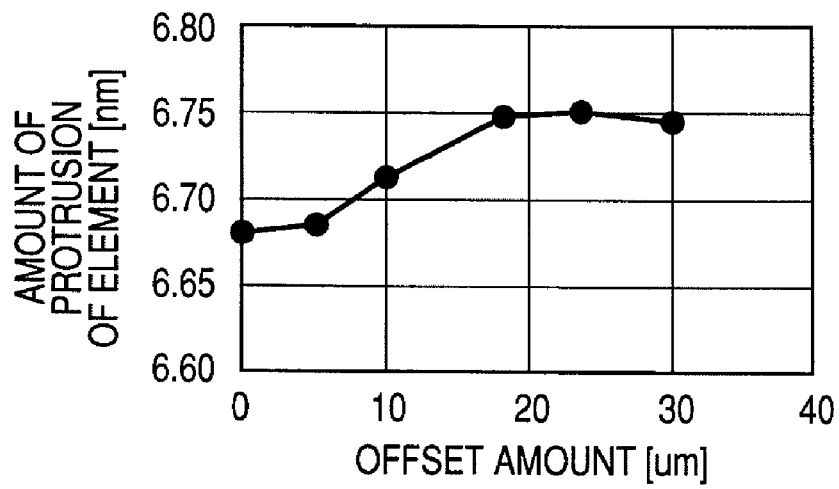
FIG. 8 is a graph illustrating the relationship between the amount of protrusion of an element and the position where the shunt line for applying a reference potential to a return yoke layer is connected to the return yoke layer.

FIG. 8 is a graph illustrating the relationship between the position where the return yoke layer 40 and the shunt line 50 are connected to each other and the amount of protrusion of an element portion due to heat generated from the heater 21. The position where the shunt line 50 is connected to the return yoke layer 40 is represented by an offset amount [μm] (distance) from the heat generating region center α of the heater 21 in the track width direction. Specifically, an offset amount is 0 at the heat generating region center α of the heater 21, an offset amount is 10 at a position that abuts on an edge 21a2 of the heater 21 in the track width direction, an offset amount is 20 at a position that is spaced from the edge 21a2 of the heater 21 in the track width direction by a distance that is half of the heater width D, and an offset amount is 30 at a position that abuts on the edge 40d of the return yoke layer 40 in the track width direction. In this case, the heater width D is 20 μm. The first connection structure satisfies the relationship 0<offset amount≦10, the second connection structure satisfies the relationship 10<offset amount<20, and the third connection structure satisfies the relationship 20≦offset amount<30. In the fourth connection structure satisfies, the offset amount is 30. The amount of protrusion of an element portion indicates a variation [nm] in a leading end (a surface facing a recording medium) of an element portion before the heater 21 is operated and while the heater 21 is being operated, which is measured at the heat generating region center α of the heater 21. The variation is measured under the same conditions except for the position where the shunt line 50 is connected. For example, the same voltage is applied to the heater 21 for the same time period.

As can be seen from FIG. 8, as the offset amount increases, the amount of protrusion of an element portion becomes larger. That is, when the position where the shunt line 50 is connected to the return yoke layer 40 deviates from the heat generating region center α of the heater 21, the amount of protrusion of the element portion increases. As the distance between the position where the shunt line 50 and the return yoke layer 40 are connected to each other and the heat generating region center α in the track width direction increases, the amount of protrusion of the element portion becomes larger. The reason why the amount of protrusion of the element portion increases is that the amount of heat transmitted from the heater 21 to the element portion increases. The structure in which the position where the shunt line 50 and the return yoke layer 40 are connected to each other deviates from the heat generating region center α of the heater 21 in the track width direction makes it possible to reduce thermal diffusion caused by the shunt line 50 and thus to improve the thermal efficiency of a heater. The position where the shunt line 50 is connected to the return yoke layer 40 may slightly deviate from the heat generating region center α. More preferably, the shunt line 50 is provided at a position obtaining an offset amount that is equal or larger than 20 where the amount of protrusion of the element portion is stabilized to a large value.

As described above, according to this embodiment, the shunt line 50 for applying the reference potential to the return yoke layer 40 is connected to the return yoke layer 40 at a position that deviates from the heat generating region center α of the heater 21. Therefore, it is possible to reduce the diffusion of heat generated from the heater 21 through the shunt line 50, and thus improve the thermal efficiency of a heater in the thin film magnetic head H provided with the shunt line 50.

In the above-described embodiment, the invention is applied to a vertical-recording-type thin film magnetic head H, but the invention is not limited thereto. The invention can be applied to a longitudinal-recording-type thin film magnetic head. When the invention is applied to the longitudinal-recording-type thin film magnetic head, a shunt line may be provided in a lower core layer or an upper core layer of a recording element. A reproducing element having a CPP structure in which a current flows in a vertical direction to the surface of a magnetoresistive film may be used as the reproducing element, instead of the TMR element.

The invention claimed is:

1. A thin film magnetic head comprising:
   a lower shield layer;
   an upper shield layer;
   a reproducing element that is provided between the lower shield layer and the upper shield layer;
   a recording element that is disposed on the upper shield layer;
   a heater that generates heat to expand at least one of the reproducing element and the recording element such that the reproducing element and/or the recording element protrude toward a recording medium; and
   a shunt line that applies a reference potential that is equal to the potentials of the lower shield layer and the upper shield layer to a magnetic layer of the recording element,
   wherein the shunt line is connected to the magnetic layer of the recording element at a position that deviates from the center of a heat generating region of the heater in a track width direction.

2. The thin film magnetic head according to claim 1,
   wherein the shunt line is connected to the magnetic layer of the recording element outside the heat generating region of the heater in the track width direction.

3. The thin film magnetic head according to claim 1,
   wherein the shunt line is connected to the magnetic layer of the recording element at a position that is spaced from an edge of the heat generating region of the heater in the track width direction by a distance that is equal to or longer than half of the length of the heat generating region in the track width direction.

4. The thin film magnetic head according to claim 1,
   wherein the shunt line extends from a rear portion of the magnetic layer of the recording element in a height direction.

5. The thin film magnetic head according to claim 1,
   wherein the shunt line is connected to an edge of the magnetic layer of the recording element in the track width direction.

6. The thin film magnetic head according to claim 1,
   wherein the shunt line is formed of a non-magnetic metal material.

* * * * *